United States Patent [19]

Ullrich

[11] Patent Number: 5,360,888
[45] Date of Patent: Nov. 1, 1994

[54] HYDROLYSIS-STABLE POLYAMIDES

[75] Inventor: Volker Ullrich, Schriesheim, Germany

[73] Assignee: Rhein Chemie Rheinau GmbH, Mannheim, Germany

[21] Appl. No.: 49,115

[22] Filed: Apr. 19, 1993

[30] Foreign Application Priority Data

Apr. 30, 1992 [DE] Germany .................. 4214193

[51] Int. Cl.$^5$ .................. C08G 69/48; C08L 77/06
[52] U.S. Cl. .................. 528/323; 528/315; 525/420; 525/424; 524/195
[58] Field of Search .................. 525/424, 420; 528/315, 528/323; 524/195

[56] References Cited

U.S. PATENT DOCUMENTS

| | | | |
|---|---|---|---|
| 3,637,608 | 1/1972 | Schaaf et al. | 528/315 |
| 4,128,599 | 12/1978 | Thomas et al. | 525/424 |
| 4,169,866 | 10/1979 | von Bonin et al. | 525/424 |
| 4,645,823 | 2/1987 | Ai et al. | 528/315 |
| 4,772,649 | 9/1988 | Andrews et al. | 525/424 |
| 4,861,828 | 8/1989 | Waggoner | 525/425 |
| 4,987,168 | 1/1991 | Kershbaumer | 525/424 |

FOREIGN PATENT DOCUMENTS 670831 7/1989 Switzerland .

Primary Examiner—John Kight, III
Assistant Examiner—P. Hampton-Hightower
Attorney, Agent, or Firm—Connolly & Hutz

[57] ABSTRACT

Polyamides stabilized to hydrolysis at high temperatures, particularly in an acidic medium, containing 0.1 to 5% by weight based on polyamide of a polymeric aromatic carbodiimide.

4 Claims, No Drawings

HYDROLYSIS-STABLE POLYAMIDES

The invention relates to polyamides, in particular nylon-6, nylon-6,6 and nylon-12, which are stable to hydrolysis at elevated temperatures in acid medium and their production. The invention relates also to shaped bodies from the polyamides, both injection moulded articles and extrudates (e.g. stretched, orientated monofilaments and multifilaments). The polyamides according to the invention contain small amounts of aromatic poly-carbodiimides, by means of which they are protected against hydrolytic degradation.

It is known that polyamides can be effectively protected from destruction by heat and light at elevated temperatures by addition of 1. salts of copper and of manganese,
2. phosphorus(III)-organic compounds,
3. phenolic antioxidants and
4. aliphatic or aromatic amines.

Usually, combinations of several of these compounds are used in order to achieve a desired synergistic effect.

None of the compounds named, however, is able to protect polyamides against hydrolysis at elevated temperatures.

Polyamides are very stable in alkaline medium; but under the influence of acids, particularly with the simultaneous presence of oxidizing agents, they are very easily cleaved hydrolytically and/or by radical reactions. It is at present not possible effectively to protect polyamides against hydrolysis in a pH range $\leq 7$, above all in the simultaneous presence of oxidizing substances.

It has been found that polyamides, especially polyamide-6, polyamide-6,6 and polyamide-12 can be effectively protected against hydrolysis by the addition of small amounts of sterically hindered aromatic carbodiimides.

The present invention therefore provides polyamides, in particular polyamide 6, polyamide 6,6 and polyamide 12, protected against decomposition in the acid pH range especially in the additional presence of oxidizing agents, which contain as stabilizers 0.1 to 5% by weight, preferably 0.5 to 4% by weight based on polyamide of polymeric aromatic carbodiimides.

Polyamides in the meaning of the invention are in particular polycondensates based on ε-caprolactam (polyamide-6) or adipic acid/hexamethylenediamine (polyamide-6,6) or γ-lauryl lactam (polyamide-12). As is generally known, these substances are stable to alkalis, but very labile to acids and oxidizing media—above all at elevated temperatures.

Suitable aromatic poly-carbodiimides are reaction products of substituted aromatic isocyanates, such as
2,6-diisopropylphenyl isocyanate,
1,3,5-triisopropyl-2,4-diisocyanatobenzene,
naphthalene-1,5-diisocyanate,
2,4-diisocyanato-3,5-diethyltoluene,
4,4'-methylenebis(2,6-diethylphenyl isocyanate),
4,4'-methylenebis(2-ethyl-6-methylphenyl isocyanate),
4,4'-methylenebis(2-isopropyl-6-methylphenyl isocyanate),
4,4'-methylenebis(2,6-diisopropylphenyl isocyanate),
4,4'-methylenebis(2-ethyl-6-methylcyclohexyl isocyanate).

The poly-carbodiimides cam be produced from pure isocyanates, e.g. the polymerization product of 1,3,5-triisopropyl-2,4-diisocyanatobenzene, or from a mixture of different isocyanates, e.g. from 50% 1,3,5-triisopropyl-2,4-diisocyanatobenzene and 50% 2,4-diisocyanato-3,5-diethyltoluene.

The polymerization is known in principle, is accelerated by standard catalysts and occurs with splitting-off of carbon dioxide (cf. J. Org. Chem. 28, 2069 (1963); J. Am. Chem. Soc. 84, 3673 (1962); Chem. Rev. 81, 589 (1981); Angew. Chem. 93, 855 (1981)).

Preferred poly-carbodiimides are:

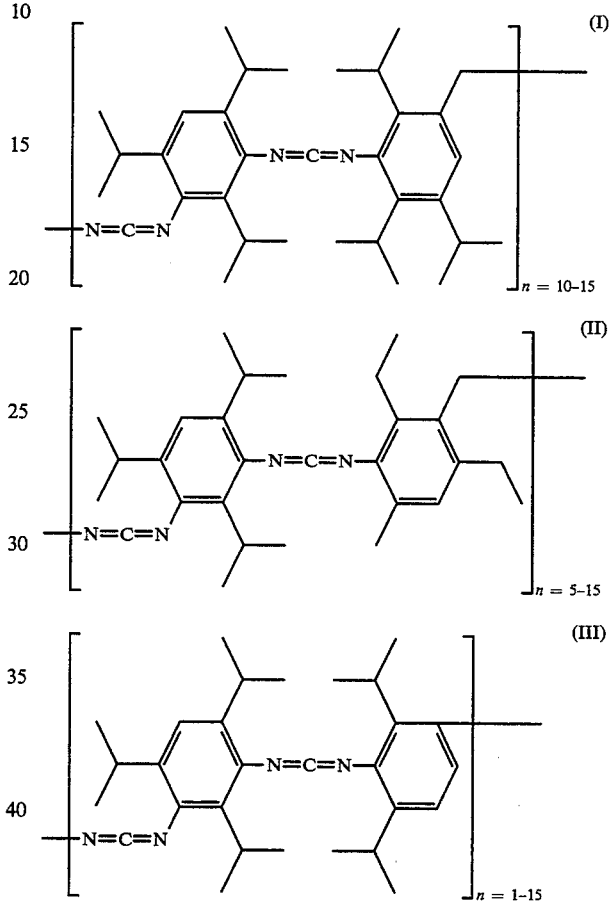

The polyamides stabilized to hydrolysis according to the invention can be produce as follows:

The polyamides with an $H_2O$ content $\leq 0.03\%$, the aromatic poly-carbodiimide and possibly additional additives are mixed together at room temperature and extruded by means of a twin-screw extruder with an L/D ratio of 28–40 and special kneading elements above the melting temperature of the polyamide. Alternatively the constituents can be fed separately into the feeding zone of the extruder and subsequently homogeneously distributed in the melt. The melt is cooled after the extrusion, granulated and dried in vacuum. The granular material so obtained has an $H_2O$ content $\leq 0.03\%$.

The polyamides so produced are characterized by increased hydrolysis resistance.

EXAMPLE 1

Polyamide-12, (Grilamid L 25/Ems AG), and a pulverulent aromatic carbodiimide—produced from 50 wt % 1,3,5-triisopropyl-2,4-diisocyanatobenzene and 50 wt % 2,4-diisocyanato-3,5-diethyltoluene, are mixed together dry and melted down in a twin-screw extruder, and the melt intermixed and extruded. The extrudate is dried to an H₂O content ≦0.03 % and subsequently injection-moulded to form S-1 standard test bars. These are subjected to hydrolysis in water vapour at 121° C. The decrease (in %) with time of the ultimate tensile strength is chosen as the measure of the chemical degradation of the polymer, the unstressed sample being given the value 100.

| Time (days) | Residual ultimate tensile strength (%) | | | | | | | |
|---|---|---|---|---|---|---|---|---|
| | 0 | 7 | 14 | 21 | 28 | 35 | 49 | 63 |
| Polyamide-12 (without Additive) | 100 | 100 | 107 | 107 | 112 | 106 | 61 | 48 |
| Polyamide-12 + 2% based on polyamide of polycarbodiimide (= 0.27% by weight NCN) | 100 | 96 | 99 | 96 | 100 | 102 | 105 | 105 |

EXAMPLE 2

Polyamide-6, (Durethan B 40 F of Bayer AG), is mixed dry with a pulverulent aromatic polycarbodiimide from 1,3,5-triisopropyl-2,4-diisocyanatobenzene extruded in a high-speed twin-screw extruder, pelletized to cylindric granules and dried to an H₂O content ≦0.03%. The pellets are injection-moulded to form S-1 standard test bars. These are subjected to hydrolysis under the following test conditions:

A) H₂O/citrate buffer (liquid); pH=4; T=100° C.
B) 95% by weight H₂O/5% by weight Al₂(SO₄)₃ (liquid); T=90° C.
C) H₂O(vapor) T=130° C. oxygen-free
D) H₂O(vapor) T=121° C. oxygen-containing.

The decrease (in %) with time of the tensile strength is chosen as the measure of the chemical degradation, the unstressed sample being given the value 100.

| A) Time (days) | Residual ultimate tensile strength (%) | | | | | |
|---|---|---|---|---|---|---|
| | 0 | 10 | 15 | 18 | 24 | 28 |
| Polyamide-6 | 100 | 80 | 73 | 69 | 54 | 32 |
| Polyamide-6 + 2% polycarbodiimide (= 0.29% by weight NCN) based on polyamide | 100 | 83 | 88 | 88 | 77 | 75 |

| B) Time (days) | Residual ultimate tensile strength (%) | | | | |
|---|---|---|---|---|---|
| | 0 | 5 | 10 | 15 | 18 |
| Polyamide-6 | 100 | 70 | 52 | 10 | — |
| Polyamide-6 + 2% polycarbodiimide (= 0.29% by weight NCN) based on polyamide | 100 | 85 | 70 | 35 | 20 |

| C) Time (days) | Residual ultimate tensile strength (%) | | | | | |
|---|---|---|---|---|---|---|
| | 0 | 3 | 5 | 7 | 14 | 21 | 28 |
| Polyamide-6 | 100 | 69 | 67 | 71 | 61 | 50 | 36 |
| Polyamide-6 + 2.5% polycarbodiimide (= 0.35% by weight NCN) based on polyamide | 100 | 74 | 70 | 78 | 82 | 75 | 70 |

| D) Time (days) | Residual ultimate tensile strength (%) | | | | | | |
|---|---|---|---|---|---|---|---|
| | 0 | 5 | 7 | 14 | 21 | 24 | 28 |
| Polyamide-6 | 100 | 65 | 56 | 23 | — | — | — |
| Polyamide-6 + 2.5% polycarbodiimide (= 0.35% by weight NCN) based on polyamide | 100 | 76 | 51 | 40 | 35 | 34 | 30 |

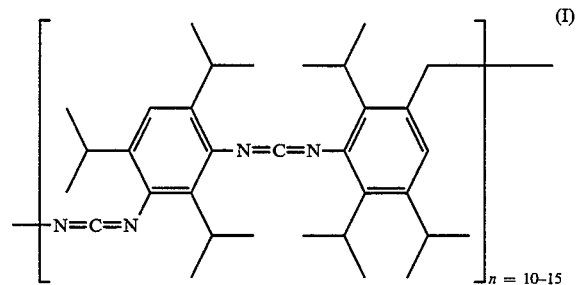

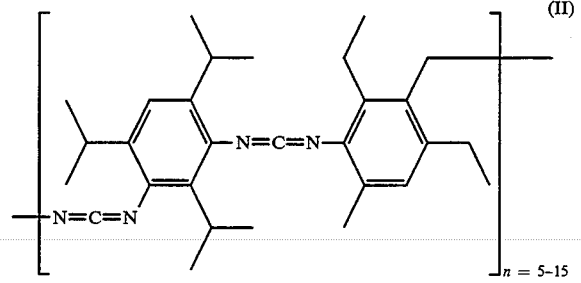

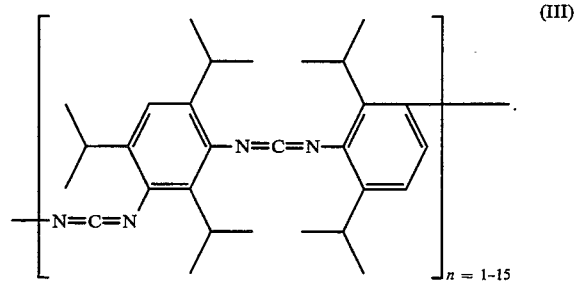

I claim:
1. Polyamide stabilized to hydrolysis in acidic medium which contains 0.1 to 5% by weight, based on polyamide, of a polymeric aromatic carbodiimide which is the reaction product of at least one substituted aromatic isocyanate selected from the group consisting of 2,6-diisopropylphenyl isocyanate, 1,3,5-triisopropyl-2,4-diisocyantobenzene, 2,4diisocyanto-3,5-diethyltoluene, 4,4'-methlyenebis(2,6-diethylphenyl isocyanate), 4,4'-methlyenebis(2-ethyl-6-methylphenyl isocyanate), 4,4'-methlyenebis(2-isopropy-6-methylphenyl isocyanate), 4,4'-methylenebis(2,6-diisopropylphenyl isocyanate), and 4,4'-methylenebis(2-ethyl-6-methylcyclohexyl isocyanate).

2. Polyamide as claimed in claim 1, prepared by melt-homogenizing the polyamide with the polymeric aromatic carbodiimide.

3. Polyamide as claimed in claim 1, wherein the polyamide is selected from the group consisting of polyamide 6, polyamide 66 and polyamide 12.

4. Polyamide as claimed in claim 1, wherein the polymeric aromatic carbodiimide has one of the following structures (I), (II) or (III):